United States Patent Office 3,823,210
Patented July 9, 1974

---

3,823,210
METHOD OF MANUFACTURING ORIENTED PRODUCT OF SYNTHETIC CRYSTALLINE POLYMER
Hikaru Shii and Eisuke Oda, Yokohama, Japan, assignors to The Furukawa Electric Co., Ltd., Tokyo, Japan
Filed May 16, 1972, Ser. No. 253,840
Claims priority, application Japan, May 22, 1971, 46/34,912; Nov. 4, 1971, 46/87,843
Int. Cl. B29d 27/00
U.S. Cl. 264—41                10 Claims

ABSTRACT OF THE DISCLOSURE

A method of manufacturing oriented product of synthetic crystalline polymer which comprises the steps of drawing uniaxially oriented materials of synthetic crystalline polymer to an extent of at least twice the original size in the direction of said orientation axis at a temperature of more than 30° C. below the melting point of said uniaxially oriented materials; applying tensile stress to the drawn material in the direction of draw axis in a solvent heated to a temperature ranging between a level 2° C. higher and a level 10° C. lower than the temperature at which said oriented material would be dissolved without tension; and under this condition extracting the soluble fractions of said drawn material.

---

This invention relates to a method of manufacturing oriented product of synthetic crystalline polymer having excellent physical properties.

To date, there has been practised a drawing process as a means of improving the properties of crystalline polymer products, such as mechanical strength, Young's modulus and transparency. When exposed to high temperature, the prior art drawn products obtainable by the prior art appreciably shrink, presenting low dimensional stability. Among these filaments of crystalline polymer made by melt spinning and drawing are indeed improved in physical properties such as mechanical strength and Young's modulus. However, products obtained therefrom decrease in the mechanical strength and Young's modulus when subjected to the heat cycle in some uses, thus failing to preserve the initial properties. A defect common to these drawn products is that their fine structure is not thermally stable. In other words, if it was attempted by the conventional process prominently to elevate the properties of oriented product of synthetic crystalline polymer, then it would be necessary for obtaining a stable structure to carry out annealing for such an extremely long period as would make it economically infeasible.

The object of this invention is to provide a method for manufacturing oriented product of synthetic crystalline polymer of excellent properties impossible to obtain by the prior art, by simple steps without using any special processing equipment. As the result of studies, it has been found that oriented product of synthetic crystalline polymer of such excellent physical properties as are impossible to attain by the customary method can be manufactured from uniaxially oriented materials of synthetic crystalline polymer in common use which are obtained by ordinary processing means such as film manufacturing apparatus and melt spinning equipment, by drawing said oriented polymer materials to an extent of at least twice the original size at a temperature of more than 30° C. below the melting point and extracting the soluble fraction of said drawn material in a solvent heated to a temperature ranging between a level 2° C. higher and a level 10° C. lower than the temperature at which the oriented material would be dissolved in a heated solvent without tension.

The above-mentioned process enables oriented polymer product of excellent properties, impossible to attain by the prior art, to be readily obtained from generally known uniaxially oriented materials of synthetic crystalline polymer used as the starting material. Though not fully understood, the reason has been studied by various means, for example, X-ray diffraction, electron microscopy and differential scanning calorimetry. The calorimetric study showed that the melting of the oriented film products was accompanied with super-heating. The wide angle X-ray diffraction measurements indicated that with the oriented product of this invention, the half value width of a diffraction profile was far narrower than that of the ordinary hot-drawn product. The small angle X-ray diffraction measurements confirmed that the product of the invention had a unique long period structure. Further, the product presented a characteristic morphology by the electron microscopy. In addition, annealing gave rise to unusual change in the micro structure of the product. It is supposed from all the above-mentioned experiments that the prominent feature of the oriented polymer product of this invention originates from the fact that the product contains a relatively large amount of the extremely perfect fine structure constituting the core of the so-called Shish-kebab structure which is deemed to arise from crystallization under particular conditions. However, this is simply an assumption and should not be construed to limit the subject matter of this invention in any way.

The appended photograph presents an electron micrograph of the Shish-kebab structure (the arrows indicate a typical pattern) observed on the surface of the film obtained by subjecting the drawn film of high density polyethylene to extraction in a heated solvent.

The reason why the starting material used in the method of this invention is limited to crystalline uniaxially oriented polymers is that employment of noncrystalline polymers or crystalline polymers not in a uniaxially oriented state presents difficulties in providing a uniform drawing effect during the drawing process, failing to obtain good oriented products of synthetic crystalline polymer by the subsequent extraction process.

Accordingly, the uniaxially oriented material of crystalline polymer used as the starting material of the method of this invention is preferably of a type for which there are proper solvent that easily dissolve it in the extraction process and particularly such type as is quickly crystallizable. It is generally easy to find such solvent for most synthetic crystalline polymers. With some polymers, for example, polytetrafluoroethylene, however, it is impossible to find a solvent capable of dissolving it under ordinary conditions.

For the above-mentioned reason, uniaxially oriented materials of crystalline polymer preferably include crystalline polyolefins such as high density polyethylene, low density polyethylene, isotactic polypropylene, poly-4- methyl pentene-1, polybutene and polyisobutene, crystalline polyesters such as polyethylene terephthalate, crystalline polyamides such as poly-ε-caprolactam, polyhexamethylene adipamide, and polyhexamethylene sebacamide, and other polymers such as polyethylene oxide, polypropylene oxide, polyvinyl alcohol and polyacrylonitrile.

Of these numerous oriented materials of synthetic crystalline polymer, those belonging to polyolefins make oriented products especially excellent in mechanical strength and other properties. Therefore, when the economic advantage of low-cost availability is taken into consideration, polyethylene and polypropylene out of polyolefins are desirable as materials for the present invention. Especially high density polyethylene is considered most suitable for this invention, because it crystallizes readily to a great extent and permits use of an inexpensive solvent and high ratio of drawing at a relatively low temperature, and because an oriented polymer product obtained therefrom by extraction has particularly excellent properties.

For commercial production of the aforementioned uniaxially oriented materials of synthetic crystalline polymer used as the starting materials of the product of this invention, it is adivsed that they should be heated at a temperature above the melting point and conducted in molten state through, for example, a nozzle or die or between rolls so as to travel in a fixed direction and thereafter cooled for solidification. In this case, the state of uniaxial orientation is determined by to what extent the polymer molecules in the molten state are oriented at the outlet of the nozzle or die as well as by the kind of said polymer. Uaxially oriented materials of synthetic crystalline polymer obtained by the above-mentioned steps may take any shape, for example, film or fiber. The crystallites of the oriented polymer material constituting its fine structure are oriented along with the direction in which the molten polymer was carried through the aforementioned nozzle, die or rolls. This is clearly seen from the results of the wide angle X-ray diffraction. The uniaxially oriented materials of synthetic crystalline polymer used in this invention should have the crystals oriented along an orientation axis so distinctly as to be easily observed by a suitable means of determination. For example, polyethylene film manufactured by the inflation method which is generally found to have an a-axis orientaiton can be made into oriented polyethylene film product of extremely excellent properties when it is drawn and later subjected to extraction in a heated solvent. In contrast, non-oriented polyethylene film obtained, for example, by the compression method fails to be made into desired oriented product, because when said non-oriented film is drawn and subjected to extraction even under the same condition as those of the present invention, the drawn material is all dissolved away. For the object of this invention, therefore, it is important to use uniaxially oriented materials of synthetic crystalline polymer as starting material. Unless uniaxially oriented, any kind of synthetic crystalline polymer materials can not be made into oriented product of excellent properties. The starting material of the oriented product of synthetic crystalline polymer is obtained by cooling and solidifying said polymer material when it is in a molten state and indicates a degree of birefringence $\Delta n$ amounting to more than $0.5 \times 10^{-3}$. The cooling is effected, for instance, at the outlet of the aforesaid nozzle or die, that is, just before said molten material begins to be solidified. The axial orientation of the crystals of said starting material is determined by its kind and the extent to which its molecules are oriented while it remains in a molten state before it is solidified. To give an example, high density polyethylene can be made into a type having an a-axis orientation by melting and thereafter cooling for solidification of molten polyethylene when its birefringence $\Delta n$ reaches $0.8 \times 10^{-3}$ in a molten state at 152° C. Further, when the birefringence $\Delta n$ reaches $3 \times 10^{-3}$ in a molten state at the same temperature of 152° C., said molten high density polyethylene can be solidified into a type having a c-axis orientation. When its birefringence $\Delta n$ indicates $8 \times 10^{-3}$ in a molten state at 198° C., polypropylene can be solidified into a type in which there are present both c- and a*-axis orientations. When its briefingence $\Delta n$ reaches $1 \times 10^{-3}$ in a molten state at 150° C., polybutene-1 can be solidified into a type having a c-axis orientation. The axial orientation of these crystalline polymers can be quantitatively ascertained by reference to X-ray Laue patterns from the intensity $I (\theta, P)$ at the angle of diffraction $2\theta$ and azimuth P. Some polymers like polyethylene terephthalate and polycaprolactam only provide uniaxially oriented polymer material whose axial orientation can be hardly observed, though a large legree of birefringence is present in these polymers in a molten state. However, when processed by the method of this invention, these uniaxially oriented polymer materials can be converted to oriented product of excellent properties, although the axial orientation is scarcely observable in the solid state. In contrast, non-oriented polymer materials can not be made into desired product, no matter how the method of this invention is applied, because the drawn material is all dissolved during the extraction process of this invention.

As mentioened above, the method of this invention enables any kind of crystalline polymer materials, provided uniaxially oriented, to be made into desired oriented product, though the method presents varying effects according to the kind and extent of said uniaxial orientation.

The method of this invention does not impose any limitation on the shape of uniaxially oriented materials of synthetic crystalline polymer used as starting material. From the industrial point of view, however, the starting materials are preferably in the shape of film in consideration of ease of drawing and subsequent extraction. However, the starting materials are not limited to films but may be uniaxially oriented monofilaments, pipes, sheets and other shaped materials. Further, the manufacturing process of these starting materials is not subject to any particular limitation. Refering to films, for example, those obtained by T-die extrusion, inflation and hot-roll calendering are all available for the method of this invention.

The method of this invention primarily consists in drawing uniaxially oriented materials of synthetic crystalline polymer in the direction of said uniaxial orinetation. When the a-axis oriented film of high density polyethylene obtained by inflation is drawn in the ratio of about 1.5 and extracted in hot xylene while tensile stress is applied to the film, then the drawn film is quickly dissolved during the extraction process is hot xylene, no matter how the conditions of said extraction are adjusted, failing to produce desired uniaxially oriented polymer product of excellent properties. As apparent from this example, drawing in the ratio of less than twice the original size presents impossibilities in the succeeding extraction process in hot solvent. In the method of this invention, therefore, drawing should be effected at a temperature of more than 30° C. below the melting point of the uniaxially oriented synthetic crystalline polymer used as starting material and in a ratio of at least twice the original size, as high as possible but falling within the range which does not give rise to the breakage of said oriented polymer material.

The reason why the temperature at which uniaxially oriented materials of synthetic crystalline polymer should be drawn is limited to more than 30° C. below its melting point is that through a higher temperature than said specified level permits drawing in a greater ratio, the drawn material will all be dissolved during the succeeding extraction process, no matter how the conditions of said extraction are adjusted, thus failing to provide desired oriented product.

The upper limit to the ratio of drawing is affected by interrelations between the kind of synthetic crystalline polymers, the shape of the oriented polymer material, etc. and cannot be defined readily. To give concrete examples, the upper limit to the ratio of drawing is set at about 25 times the original for high density polyethylene, about 20 times for polypropylene, about 3.5 times for polyethylene terephthalate and about 4 times for Nylon 6. Further, the direction of drawing should preferably be parallel in the direction of the orientation axis of the polymer material used. However, drawing may be effected in a direction approximately parallel with that of said axial orientation. For example, drawing may be carried out with an inclination falling within the range of $\pm 5°$. Temperature of drawing should preferably range between a level more than 10° C. above the glass transition temperature of the uniaxially oriented materials of crystalline polymer used and a level more than 30° C. below its melting point, because such control of drawing temperature enables the oriented polymer material to be easily drawn in the desired ratio. The temperatures and ratios of drawing for individual polymer materials available as starting materials are 20° to 80° C. and 7 to 20 times for high density polyethylene; 60° to 100° C. and 3 to 5 times for polyethylene terephthalate; and 60° to 100° C. and about 4 times for polycaprolactam.

Heating medium for hot drawing may be of any type, provided it does not degrade the quality of a drawn material or obstruct the drawing operation. In this connection, for example, heated air or hot water may be recommended because they are easy to handle.

The method of this invention consists in drawing uniaxially oriented materials of synthetic crystalline polymer and extracting the prescribed amount of soluble fractions therefrom with tensile stress applied to the drawn material in the direction of said uniaxial orientation in a solvent heated to a temperature ranging between a level 2° C. higher and a level 10°C. lower than the temperature at which said drawn material would be dissolved without tension. The amount of soluble fractions which should be extracted varies widely with the kind of uniaxially oriented materials of synthetic crystalline polymer used and the conditions in which the drawn material was previously processed and can not be defined readily. From the standpoint of the properties and yield of oriented polymer product, however, the extracted amount is preferably between 40 and 95% by weight of the original drawn material. The following is the reason. If the extracted amount is less than 40% by weight of the original drawn material, then precipitates are liable to deposit on the surface of an oriented polymer product obtained, and further said product will have a relatively small tensile strength. Conversely where the extracted amount increases over 95% by rigorous extraction, then the drawn material will become unstable in the strength and possibly break during extraction. Further, the product will be obtained in a low yield, resulting in economic disadvantage.

For the object of this invention, it is indispensable to carry out the extraction of a drawn material in a heated solvent with tensile stress applied in the axial direction in which the material is drawn. The reason is that if the drawn material is immersed in a heated solvent without being subjected to tensile stress, then it will be quickly dissolved. This event is liable to take place even when the drawn material is released during extraction from the tensile stress applied thereto. Thereafter, full care should be taken against such occurrence. The magnitude of tensile stress which should be applied during extraction in a heated solvent is preferably smaller than the tensile strength of the drawn material in the heated solvent and more than 10% of the yielding stress of the drawn material in said heated solvent.

The reason is that if an unduly low tensile stress is applied during extraction in said heated solvent, then the drawn material will be quickly extracted possibly rendering the manufacturing process itself unstable, and that if an excessively high tensile stress is applied, then the drawn material is liable to break during extraction. Here is the concrete range of suitable tensile stress for the drawn materials of individual synthetic crystalline polymers. For high density polyethylene, the tensile stress is set at a magnitude of 10 to 80 kg./cm.$^2$, or preferably 15 to 30 kg./cm.$^2$. While the solvent should be heated to temperatures falling within the prescribed range in order to effect smooth extraction, there should be applied higher levels of temperature within said range in order to shorten the time of extraction. The temperatures at which high density polyethylene would be dissolved without tension in heated solvents are 109° C. for toluene, 110° C. for o-xylene, 112° C. for Tetralin, and 128° C. for octadecane.

Effecting ultrasonic irradiation on a solvent during extraction is very preferable, because the properties of the resultant oriented product are more prominently improved than when no such irradiation is carried out.

The solvent adhering to the extraction residue should be quickly removed, for example, by evaporation or by washing with such a solvent as is compatible with the first mentioned solvent and yet incompatible with said residue. In the continuous process, it is advised to remove the solvent in the extraction residue before the residue, that is, oriented product is taken up in order to prevent the sticking of the redidue itself, which would cause difficulties in handling.

Serial arrangement of the drawing and extraction processes in practising the method of this invention offers manufacturing, as well as economic, advantages. Further, it assumes greater importance to have the process of preparing uniaxially oriented materials of crystalline polymer before the above-mentioned two processes for tandem operation.

Uniaxially oriented product of synthetic crystalline polymer obtained by the method of this invention has far more excellent properties than one manufactured by any conventional structure-stabilizing process, for example, drawing an annealing that has been used in commercial production of this kind of product. Accordingly, the method of this invention is very useful for the manufacture of industrial materials which are required to have high mechanical strength, high dimensional stability, small shrinkage, little creep and high solvent resistance or for the manufacture of filaments for synthetic paper and for fiber reinforced plastic materials.

This invention will be more fully understood by reference to the examples which follow.

Example 1

A continuous film of high density polyethylene (melting point; 135° C.) was produced by inflation method under the following conditions: the temperature of die was set at 230° C. and the blow ratio was controlled at 3. From the X-ray diffraction measurements it was found that the film thus obtained exhibited a-axis orientation to its machine direction. The film was drawn parallel with the machine direction at the temperatures and draw ratios given in Table 1, and was subjected to extraction by immersing it in heated xylene while a tensile stress was applied to the drawn film. The Table also presents the physical properties of the oriented film products obtained by the drawing and extraction procedure in succession.

TABLE 1

|  | Conditions of drawing | | Conditions of extraction | | | Yield of oriented film product (percent) | Properties of oriented film product | |
| --- | --- | --- | --- | --- | --- | --- | --- | --- |
|  | Ratio of drawing | Temperature of drawing (°C.) | Temperature of solvent (°C.) | Tensile stress (kg./cm.²) | Time of extraction (min.) |  | Tensile strength (kg./cm.²) | Shrinkage at 130° C. (percent) |
| Experiment numbers: | | | | | | | | |
| 1 | 20 | 54 | 106 | 16 | 5 | 30 | 7,600 | 3 |
| 2 | 20 | 80 | 106 | 16 | 5 | 20 | 7,600 | 3 |
| 3 | 20 | 95 | 106 | 16 | 5 | 7 | 7,800 | 2 |
| 4 | 20 | 80 | 106 | 40 | 5 | 25 | 8,000 | 2 |
| 5 | 20 | 80 | 106 | 40 | 3 | 30 | 7,500 | 3 |
| 6 | 7 | 80 | 106 | 40 | 2 | 6 | 5,700 | 5 |
| 7 | 7 | 20 | 106 | 40 | 5 | 10 | 8,000 | 2 |
| 8 | 7 | 20 | 106 | 5 | 5 | 6 | 5,000 | 6 |
| Control numbers: | | | | | | | | |
| 1 | 20 | 110 | 106 | 16 | 5 | 0 |  |  |
| 2 | 20 | 120 | 106 | 16 | 5 | 0 |  |  |
| 3 | 20 | 120 | 106 | 16 | 1 | 10 | 350 | 10 |
| 4 | 20 | 80 | 115 | 16 | 1 | 0 |  |  |
| 5 | 7 | 20 | 120 | 16 | 1 | 0 |  |  |
| 6 | 7 | 20 | 90 | 16 | 5 | 80 | 200 | 25 |
| 7 | 20 | 80 |  |  |  | 0 | 2,800 | 36 |
| 8 | 7 | 20 |  |  |  | 0 | 3,000 | 90 |

As apparent from the results shown in Table 1, the oriented products of Experiments 1 to 8 manufactured under the conditions specified by the method of this invention have such excellent properties as great mechanical strength and extremely small shrinkage at a temperature of 130° C. Further, it has been found particularly preferable to draw the inflation film in the direction of its orientation axis at temperatures of 50 to 80° C., because there can be obtained oriented film products of excellent properties in high yield.

By way of comparison with the above-mentioned experiments, there were tested several controls, of which Controls 1 to 3 were prepared by drawing the inflation film of high density polyethylene in the direction of its orienation axis at a temperature of higher than 110° C. approaching its melting point and later subjecting the film to extraction. The drawn material, when extracted for 5 minutes, dissolved readily with the result that there was not obtained desired oriented film product at all. On the other hand, the oriented film product obtained by considerably shortening the extraction time presented very poor physical properties. With respect to Controls 4 to 6, extraction was carried out at 115° C. or higher temperature, or at as low a temperature as 90° C. It was found that high temperature extraction caused the drawn material to be easily dissolved, failing to provide desired oriented film product, whereas low temperature extraction only provided film product of poor physical properties. Table 1 also gives the physical properties of Controls 7 and 8 which were prepared simply by drawing the inflation film of high density polyethylene in the direction of its orientation axis, but without extraction. As seen from Table 1, the physical properties of said Controls 7 and 8 were far lower than those of the oriented film products represented by the examples of this invention.

Example 2

A continuous sheet of film of high density polyethylene (melt index=0.4) was produced by the inflation method under the following conditions: the temperature of die was set at 230° C., the blow ratio was controlled at 3, and the birefringence ($\Delta n$) of the blown film in a molten state at a distance of 30 mm. from the die was $1\times10^{-3}$. The film obtained by quenching the molten film showed a-axis orientation, which was confirmed by X-ray diffraction measurements.

The inflation film was continuously drawn in the direction of its orientation axis (the direction in which the film was extruded) up to 20 times its original length by conducting the film through an air oven kept at 80° C. at a linear speed of 1.5 cm./min. The soluble fraction of the drawn film was also continuously extracted by immersing the drawn film travelling at a linear speed of 30 cm./min. in hot toluene at 105° C. under tensile stress of 15 kg./cm.². The film was immersed in the extraction bath for 2 min.

The concentration of the extracted polymer in hot toluene was kept below 4 weight percent during the extraction process.

The physical properties of the film product, thus obtained at a yield of 20% by weight of the inflation film, are shown in Table 2. For comparison, a film was obtained by the same drawing process as described above and without any extraction treatment. The physical properties of the latter film are also shown in Table 2.

From the X-ray diffraction measurements of the film obtained by the present invention in various extraction times, it was found that the azimuthal profile of the film, which relates to the orientation of the crystallites, did not change with the extraction time, but that the half value width of the diffraction angle profile, which reflects the degree of crystal perfection, crystallite size and the degree of strain in the crystal decreased as the extraction time increased.

From the small angle X-ray diffraction measurements conducted in a film extracted at a linear speed of 30 cm./min., the long period was as much as about 350 Å.

The melting behaviour of the oriented film was measured by differential scanning calorimetry while the temperature was increased at the rate of 10° C./min., showing that the temperatures at which the melting began, the peak appeared, and the melting ended, for the films drawn at 80° C. without any extraction, were 126° C., 132° C. and 134° C., respectively. The above-mentioned temperatures for the oriented polymer product obtained by the present invention were 133° C., 136° C. and 160° C., showing shifts of 7° C., 4° C. and 26° C. towards higher temperature side, respectively.

As compared with the thermogram of the drawn film obtained without any extraction treatment, in which a shoulder of the melting curve was present only to the lower temperature side of the peak temperature, it is characteristic of the product of the present invenotn that the shoulder is present only to its higher temperature side. This suggests that the unusual melting of the oriented film products was accompanied by super-heating.

Electron microscopy of the surface of the drawn film after the extraction discloses the fact that there is a "Shish-kebab structure," which is often observed in samples experimentally obtainable under specified crystallization conditions, e.g. stir-crystallization from dilute solution. It may be inferred from the X-ray diffraction data and thermograms together with electron microscopic observations that the excellent physical properties of oriented polymer product according to this invention, as shown in Table 2, originate from its fine structure.

TABLE 2

|  | Tensile strength (kg./cm.²) | Tensile modulus (kg./cm.²) | Contraction at 130° C) (percent. |
|---|---|---|---|
| Present invention | 7,500 | 120,000 | 5 |
| Control | 3,800 | 37,000 | 45 |

|  | Temp. at which thermal contraction begins (°C.) | M.P. (temp. at which tensile strength disappears) (°C.) | Solubility in dodecyl benzene at 100° C. |
|---|---|---|---|
| Present invention | 130 | 151 | Insoluble. |
| Control | 55 | 141 | Soluble. |

Example 3

In the process of Example 2, the effects of replacing some part of the polymer solution with fresh solvent preheated to the extraction temperature were examine. As shown in Table 3 the efficiency of extraction and the tensile strength of the film products are increased by suppressing the accumulation of the dissolved polymer.

TABLE 3

| Concentration of the polymer in the solution (weight percent) | Tensile strength (kg./cm.²) | Yield of the film product (percent) |
|---|---|---|
| 7.5 | 7,200 | 25 |
| 4 | 7,500 | 21 |
| 2.5 | 7,700 | 11 |
| 0.5 | 7,700 | 8 |

Example 4

A continuous film of isotactic polypropylene (melt index=0.9) was produced by a calender roll, the surface temperature of which was 220° C. The film was taken up at the rate of 40 m./min. while being slightly drawn with both sides of the molten sheet film cooled by air streams at the closest position to the calender roll. The ultimate thickness of the film thus obtained was 30 microns and wide angle X-ray diffraction measurements show that eight weight percent of a*-axis oriented crystallites was observed along the direction in which the film was formed by the calender roll.

The film sheet thus obtained was stretched at the draw ratio of 15 times by a hot roll at 130° C. and was immersed for 5 minutes in xylene at 120° C. while applying a tensile stress of 15 kg./cm.² uniformly to the film, so that 60 weight percent of the drawn film was extracted. Table 4 shows the physical properties of the oriented film thus obtained and also, for comparison, those of the film drawn 15 times as large, given no extraction treatment. The result of the differential scanning calorimetry elucidates that the melting observed in the polypropylene film product thus obtained contains a phenomenon of a similar tendency to that observed in the melting of polyethylene film product in Example 2. In contrast to the thermogram of a hot drawn polypropylene film made by a conventional method, where a shoulder of the melting curve was present only to the lower temperature side of the melting peak, it is characteristic of the present film that the shoulder was present only to its higher temperature side without any shoulder in the lower temperature side and that the shoulder reached about 200° C.

TABLE 4

|  | Tensile strength (kg./cm.²) | Contraction at 150° C. (percent) | Young's modulus (kg./cm.²) | Temperature at which thermal shrinkage begins (°C.) |
|---|---|---|---|---|
| Present invention | 8,500 | 4 | 120,000 | 170 |
| Control | 2,300 | 25 | 80,000 | 65 |

Example 5

A continuous polyethylene terephthalate film 200 microns thick was produced by the T-die extrusion method. The molecular weight of the polymer used was $2.0 \times 10^4$, the speed of film take-up was 18 m./sec., and the die temperature was 290° C. The extruded film indicated a birefringence $\Delta n$ of $100 \times 10^{-5}$ as measured in a molten state at a distance of 100 mm. from the die. The degree of the birefringence of the film in the solid state was $700 \times 10^{-5}$. The extruded film was drawn up to 4 times its original length by a hot roll heated to 100° C. and was quenched. The film thus drawn was immersed in a mixed solvent system of phenol-chloroform (50/50 by weight) at 80° C., while a tensile stress of 9 kg./cm.² was applied to the film along the drawing directon. The drawn film was immersed 10 minutes in the solvent and had 85 weight percent thereof extracted. The oriented film product thus obtained indicated a tensile strength of 7,120 kg./cm.² and a shrinkage of 90° C. of 4%, whereas, before subjected to extraction, the drawn film showed a tensile strength of 2,400 kg./cm.² and a shrinkage at 90° C. of 15%.

Example 6

A 210 microns thick continuous film of polycarprolactam was produced by the T-die extrusion method. The molecular weight of the polymer used was $1.3 \times 10^4$, the speed of film take-up was 40 m./sec., and the die temperature was 270° C. The extruded film indicated a birefringence $\Delta n$ of $60 \times 10^{-5}$ as measured in a molten state at a distance of 100 mm. from the die, whereas the degree of birefringence of the extruded film in the solid state was $400 \times 10^{-5}$. The extruded film was drawn up to 4 times its original length in hot water at 80° C. and was immersed in an aqueous solution of phenol (90% phenol by weight) of 60° C., while tensile stress of 15 kg./cm.² was applied to the film along the drawing direction. An oriented film product obtained by immersing the drawn film for eight minutes in a hot-solvent and extracting 65 weight percent thereof had excellent properties, namely, the product indicated a tensile strength of 6,600 g./cm.² and a shrinkage at 90° C. of 8%, whereas, before subjected to extraction, the drawn film showed a tensile strength of 4,000 kg./cm.² and a shrinkage at 90° C. of 18%.

What we claim is:

1. A method of manufacturing oriented products of synthetic crystalline polymer of excellent physical properties which comprises the steps (1) drawing extruded synthetic crystalline polymer selected from the group consisting of polyolefins, polyesters, polyamides, polyalkylene oxide, polyvinyl alcohol and polyacrylonitrile used as starting material in a ratio of at least twice the original size in the extruded direction of said polymer at a temperature of more than 30° C. below the melting point of the said polymer and thereafter (2) extracting soluble fractions of said drawn polymer in a solvent, which dissolves said polymer quickly, heated to a temperature ranging between 2° C. higher and 10° C. lower than the temperature at which the drawn polymer would be dissolved without tension in the heated solvent while a tensile stress ranging between a value lower than the tensile strength presented by the drawn polymer in the heated solvent and a value greater than 10% of the yielding stress of the drawn polymer in said solvent is applied in the drawing direction of said drawn polymer.

2. A method of manufacturing oriented products of polyolefin of excellent physical properties which comprises the steps (1) drawing extruded polyolefin used as starting material in the ratio of at least twice the original size in the extruded direction of the polyolefin at a temperature of more than 30° C. below the melting point of said polyolefin and thereafter (2) extracting soluble fractions of the drawn polyolefin in a solvent, which dissolves polyolefin quickly, heated to a temperature ranging between 2° C. higher and 10° C. lower than the temperature at which the drawn polyolefin would be dissolved without tension in the heated solvent while a tensile stress ranging between a value lower than the tensile strength presented by the drawn polyolefin in the heated solvent and a value greater than 10% of the yielding stress of the drawn polyolefin in said solvent is applied in the drawing direction of said drawn polyolefin.

3. A method of manufacturing oriented products of high density polyethylene of excellent physical properties which comprises the steps of (1) drawing extruded high density polyethylene in a ratio of at least twice the original size in the extruded direction of polyethylene at a temperature of more than 30° C. below the melting point thereof and thereafter (2) extracting soluble fractions of the drawn polyethylene of step (1) in solvent selected from the group consisting of toluene, xylene, Tetralin and octadecane heated to a temperature between about 99–111° C. for toluene, 100–112° C. for xylene, 102–114° C. for Tetralin and 118–130° C. for octadecene while a tensile stress of at least 5 kg./cm.$^2$ is applied in the drawing direction of said drawn polyethylene.

4. The method according to claim 1 wherein said extruded polymer is drawn at temperatures ranging between more than 10° C. above the glass transition temperature of said materials and more than 30° C. below the melting point of said materials.

5. The method according to claim 1 wherein the extraction in a heated solvent of the soluble fractions of drawn polymer is brought to an end when the amount thus extracted accounts for 40 to 95% by weight thereof.

6. The method according to claim 1 wherein the drawn polymer is subject to extraction simultaneous with ultrasonic vibrations.

7. The method according to claim 1 wherein said extruded polymer is in the form of a film.

8. The method according to claim 7 wherein said film is of the type prepared by inflation method.

9. The method according to claim 7 wherein said film is of the type prepared by T-die extrusion method.

10. The method according to claim 1 wherein said extruded polymer is in the form of monofilaments obtained by melt spinning.

References Cited

UNITED STATES PATENTS

| | | | |
|---|---|---|---|
| 3,376,238 | 4/1968 | Gregorian | 264—49 |
| 3,020,597 | 2/1962 | Smith-Johnnsen | 264—49 |
| 3,215,486 | 11/1965 | Hada et al. | 8—74 |
| 3,165,563 | 1/1965 | Rasmussen | 264—288 |
| 3,621,091 | 11/1971 | Hertz | 264—342 R |
| 3,679,540 | 7/1972 | Zimmerman | 264—210 R |

FOREIGN PATENTS

| | | | |
|---|---|---|---|
| 818,516 | 8/1959 | Great Britain | 264—288 |

ROBERT F. WHITE, Primary Examiner

J. B. LOWE, Assistant Examiner

U.S. Cl. X.R.

264—232